(12) United States Patent
Kosmowski et al.

(10) Patent No.: US 8,461,480 B2
(45) Date of Patent: Jun. 11, 2013

(54) ORTHOGONAL INTEGRATED CLEAVING DEVICE

(75) Inventors: Mark T. Kosmowski, Portland, OR (US); Mehmet E. Alpay, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 400 days.

(21) Appl. No.: 12/957,063

(22) Filed: Nov. 30, 2010

(65) Prior Publication Data
US 2012/0132628 A1    May 31, 2012

(51) Int. Cl.
*B23K 26/14* (2006.01)
*B23K 26/00* (2006.01)

(52) U.S. Cl.
USPC ................... 219/121.67; 219/121.76

(58) Field of Classification Search
USPC ............. 219/121.6–121.62, 121.67–121.82
See application file for complete search history.

(56) References Cited

U.S. PATENT DOCUMENTS

| | | | |
|---|---|---|---|
| 3,453,097 A * | 7/1969 | Hafner | 65/112 |
| 5,498,851 A * | 3/1996 | Hayashi et al. | 219/121.7 |
| 5,630,308 A * | 5/1997 | Guckenberger | 53/412 |
| 6,259,058 B1 | 7/2001 | Hoekstra | |
| 6,489,588 B1 | 12/2002 | Hoekstra et al. | |
| 7,638,731 B2 * | 12/2009 | Kosmowski | 219/121.68 |
| 2002/0125232 A1 | 9/2002 | Choo et al. | |
| 2002/0190435 A1 | 12/2002 | O'Brien et al. | |
| 2007/0284785 A1 | 12/2007 | Hoekstra | |
| 2008/0093349 A1 | 4/2008 | Bruland et al. | |
| 2010/0224604 A1 | 9/2010 | Budde et al. | |

FOREIGN PATENT DOCUMENTS

KR    10-0887947 B1    3/2009

OTHER PUBLICATIONS

Korean Intellectual Property Office, International Search Report and Written Opinion in corresponding International application No. PCT/US2011/058039, dated May 10, 2012.

* cited by examiner

*Primary Examiner* — Sang Paik
(74) *Attorney, Agent, or Firm* — Young Basile

(57) ABSTRACT

An orthogonal integrated cleaving apparatus and methods of controlling such an apparatus are taught. The cleaving apparatus includes two cleaving devices mounted at right angles with respect to a mount facing a substrate to be processed. The non-metallic and/or brittle substrate is separated along two orthogonal axes without rotating or moving the substrate to a second machine by moving the mount or the substrate along the axes. Each cleaving device laser sequentially heats a surface of the substrate along a respective cutting axis, cools the cut area and then laser re-heats the cut area to form a clean break.

13 Claims, 7 Drawing Sheets

ORTHOGONAL INTEGRATED CLEAVING DEVICE

TECHNICAL FIELD

The present invention relates in general to a cleaving apparatus, particularly to an orthogonal integrated cleaving apparatus capable of cutting a substrate, e.g. glass, along two axes.

BACKGROUND

Presently, laser-thermal glass cutting is done with processes performed in a serial fashion. The first step is heating the glass with a laser while moving the glass or the processing apparatus along one axis. The next step is to rapidly cool the glass by application of a cooling mist. As movement continues, the mist is removed by a vacuum pickup, and a second laser on an opposite side of the vacuum pickup reheats the glass to form a clean break. Generally, the glass is rotated to perform cuts along another axis, either intact or in pieces. For example, if the glass is large format glass, such as over 1.5 meters in length, the glass is cut on one axis. The resulting strips are then moved to another system to be processed.

BRIEF SUMMARY

Embodiments of the invention improve throughput by allowing cleaving of glass along two axes without reorienting or transporting the glass to another system to complete singulation. This also allows, in certain cases, the elimination of a second system so as to save floor space and money.

One embodiment of an orthogonal integrated cleaving apparatus for laser-thermal processing of a substrate described herein comprises a mounting head facing a processing surface supporting the substrate, at least one laser source, and a first cleaving device and a second cleaving device mounted on the mounting head on respective perpendicular planes defined by the mounting head, the perpendicular planes being orthogonal to the processing surface. Each of the cleaving devices includes assembly means for generating a laser heating beam having a tear-like shape on a surface of the substrate, a nozzle that emits a cooling mist on the surface of the substrate, the nozzle located along a cutting axis defined by the laser heating beam and the nozzle located subsequent to the generating means in a cutting direction along the cutting axis, a vacuum pickup that vacuums up the cooling mist, the vacuum pickup located along the cutting axis and subsequent to the nozzle in the cutting direction, and a reheating assembly that generates a laser heat spot on the surface of the substrate along the cutting axis, the reheating assembly located subsequent to the vacuum pickup in the cutting direction. The apparatus also includes a first motor that operates to move one of the mounting head and the processing surface along the cutting axis of the first cleaving device so as to process the substrate using the first cleaving device, and a second motor that operates to move one of the mounting head and the processing surface along the cutting axis of the second cleaving device so as to process the substrate using the second cleaving device. A controller of the apparatus is configured to control the first cleaving device while the first motor is operating, control the second cleaving device while the second motor is operating and control the at least one laser source to provide laser energy to the assembly means and the reheating assembly of whichever of the first cleaving device and the second cleaving device is being controlled.

Another orthogonal integrated cleaving apparatus for laser-thermal processing of a substrate taught herein comprises a mounting head facing a processing surface supporting the substrate, at least one laser source, a first cleaving device mounted on the mounting head on a first plane defined by the mounting head, the first plane being orthogonal to the processing surface, and a second cleaving device mounted on the mounting head on a second plane defined by the mounting head, the second plane being orthogonal to the first plane and to the processing surface. The first cleaving device includes at least one galvo that generates a laser heating beam having a tear-like shape on a surface of the substrate using the at least one laser source, the laser heating beam defining a cutting axis of the first cleaving device, an F-theta lens located between the at least one galvo and the processing surface, a first nozzle that emits a cooling mist on the surface of the substrate along the cutting axis, the first nozzle located subsequent to the at least one galvo in a cutting direction of the first cleaving device, a first vacuum pickup that vacuums up the cooling mist, the first vacuum pickup located adjacent the first nozzle in the cutting direction of the first cleaving device and a first reheating assembly that generates a laser heat spot on the substrate along the cutting axis, the first reheating assembly located subsequent to the first vacuum pickup in the cutting direction of the first cleaving device. The second cleaving device similarly includes at least one galvo that generates a laser heating beam having a tear-like shape on a surface of the substrate using the at least one laser source, the laser heating beam defining a cutting axis of the second cleaving device, where the F-theta lens located between the at least one galvo and the processing surface, a second nozzle that emits a cooling mist on the surface of the substrate along the cutting axis, the second nozzle located subsequent to the at least one galvo in a cutting direction of the second cleaving device, a second vacuum pickup that vacuums up the cooling mist, the second vacuum pickup located adjacent the second nozzle in the cutting direction of the second cleaving device, and a second reheating assembly that generates a laser heat spot on the substrate along the cutting axis, the second reheating assembly located subsequent to the second vacuum pickup in the cutting direction of the second cleaving device. This exemplary apparatus also includes a first motor that operates to move one of the mounting head and the processing surface along the cutting axis of the first cleaving device so as to process the substrate in the cutting direction of the first cleaving device using the first cleaving device, a second motor that operates to move one of the mounting head and the processing surface along the cutting axis of the second cleaving device so as to process the substrate in the cutting direction of the second cleaving device using the second cleaving device, and a controller configured to control the first cleaving device while the first motor is operating, control the second cleaving device while the second motor is operating, control the at least one laser source to provide laser energy to the at least one galvo and the first reheating assembly while the controller is controlling the first cleaving device, and control the at least one laser source to provide laser energy to the at least one galvo and the second reheating assembly while the controller is controlling the second cleaving device.

Details of and variations in these embodiments and others are described in more detail below.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
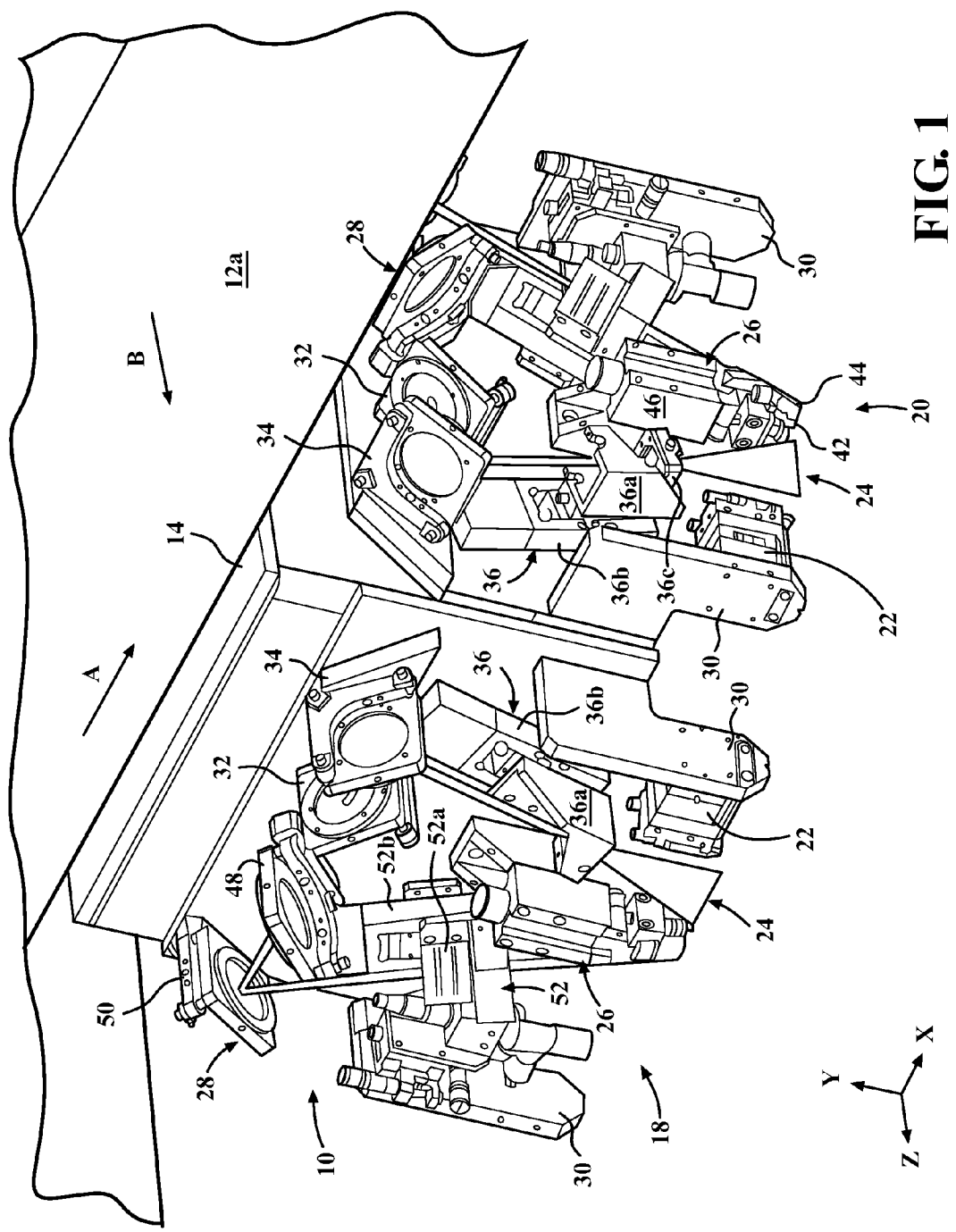
FIG. 1 is a partial perspective view of an orthogonal integrated cleaving apparatus in accordance with one embodiment of the invention.

One embodiment of the invention is initially described with reference to FIGS. 1 and 2. As shown, an orthogonal integrated cleaving apparatus 10 is mounted on a gantry 12 for movement of a head 14 of apparatus 10 along two axes through the use of conventional techniques, such as coupling head 14 to an arm 12a of gantry 12 with a linear motor (see FIG. 7) so that head 14 moves along arm 12a and coupling arm 12a to rails 12b of gantry 12 with one or more linear motors (see FIG. 7) so the arm 12a and head 14 move along rails 12b. In this case, an x-axis extends in a first direction along the plane of a processing surface 16, a y-axis extends perpendicular to the processing surface 16 in the up-and-down direction, and a z-axis is orthogonal to each of the of the x-axis and the y-axis.

Orthogonal integrated cleaving apparatus 10 is formed of two cleaving devices 18, 20 arranged at a right angle with respect to each other on head 14. In this embodiment, devices 18, 20 include the same components having the same arrangement in a cutting direction along respective x- and z-axes. The cutting direction along the x-axis is indicated by arrow A, and movement in the cutting direction A is achieved by moving head 14 along arm 12a of gantry 12. The cutting direction along the z-axis is indicated by arrow B, and cutting direction B is achieved by moving arm 12a, and thus head 14, along rails 12b of gantry 12. Note that instead of the arrangement shown, head 14 could be fixedly mounted above processing surface 16 where processing surface 16 is mounted for movement along two axes by an underlying support (not shown) with rails and linear motors similar to the discussion above. Further, head 14 could be mounted for movement in along one of x- and z-axis, while processing surface is mounted for movement along the other axis. Head 14 can include mounting surfaces for devices 18, 20 that move them along the y-axis, but this is not necessary.

Cleaving devices 18, 20 each include a conventional arrangement of a crack initiator 22, a laser heating assembly 24, a mist and vacuum assembly 26, a laser reheating assembly 28 and an inspection camera 30 arranged along cutting direction A or B. Crack initiator 22 generally comprises a small carbide disk pushed down into a glass substrate 28 to start a crack therein. This crack where the laser cleaving originates is also called a seed crack. One exemplary crack initiator 22 is available from Electro Scientific Industries, Inc. (ESI), of Portland, Oreg. as part no. 01500-200-006M. Although the substrate is described as glass herein, the invention can be used with substrates comprising other nonmetallic and/or brittle materials. In such an application, crack initiator 22 may be omitted.

Laser heating assembly 24 forms an initial heating beam in a tear-drop shape. Specifically, laser heating assembly 24 includes a first mirror 32 directing a laser beam to a second mirror 34. Second mirror 34 directs the reflected laser beam through laser focuser 36 onto substrate 38 to be singulated, cut, cleaved or otherwise separated. Laser focuser 36 includes a lens mount 36a supporting a lens element and adjustable along the direction of the path of the laser beam within a base 36b fixedly mounted to head 14. By example, a laser focusing scribe lens assembly having part no. 01500-202-000-3 from ESI can be used as laser heating assembly 24 to support a lens. One possible lens element is part no. 250381 available from ESI, which is designed to receive a round beam and shape it into the elongate tear-drop shape.

Figure 7:
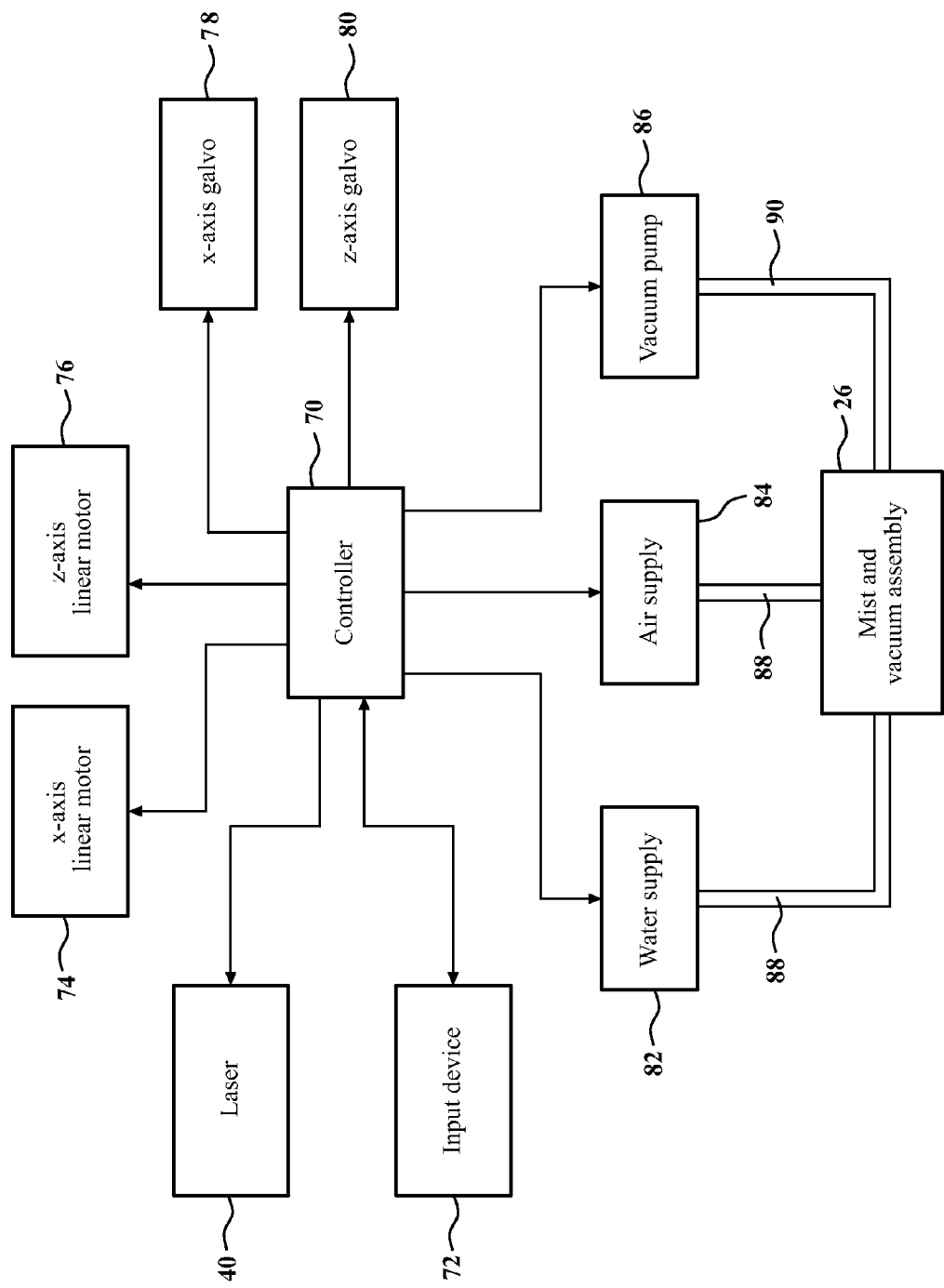
FIG. 7 is a control diagram illustrating connections between a controller and its controlled elements according to the embodiment of FIGS. 3-5.

Laser beam is provided by one or more laser sources 40 (shown in FIG. 7). Laser source 40 are typically mounted either inside head 14 or spaced remotely from head 14 and are directed by additional mirrors to first mirror 32 and to first mirror 48 of laser reheating assembly 28 discussed hereinafter. Desirably, one laser source 40 would provide energy to the first mirror 32 of each cleaving device 18, 20, while a second laser source 40 would provide energy to the first mirror 48 of each cleaving device 18, 20. Laser source 40 is selected based on the material of substrate 38. When the material is glass, for example, laser source 40 can be a $CO_2$ laser source or a YAG laser source used in continuous wave (CW) mode. Power is controlled by changing the duty cycle of laser source 40.

Mist and vacuum assembly 26 includes a cooling mist nozzle 42 and a semicircular vacuum nozzle 44. Vacuum nozzle 44 partially surrounds and is arranged rearward of cooling mist nozzle 42 with respect to the cutting direction A or B. Cooling mist nozzle 42 and vacuum nozzle 44 and mounted at an end of housing 46 that houses all the connectors 88, 90 needed to supply water and/or air to cooling mist nozzle 42 and a vacuum to vacuum nozzle 44. Generally, supply of the water/air 82, 84 and a vacuum pump 86 to provide the vacuum are mounted inside head 14 (see FIG. 7). One assembly that is commercially available and can be used in this combination is part no. 01500-203-000 from ESI.

Laser reheating assembly 28 forms a laser spot have an oval shape with its elongate length extending generally perpendicular to the cutting direction A or B. Specifically, laser reheating assembly 28 includes a first mirror 48 directing a laser beam to a second mirror 50. Second mirror 50 directs the reflected laser beam through laser focuser 52 onto the glass substrate 38 to complete the cut of substrate 38 so that it is not necessary to hand break substrate 38 along the scribe line created by the laser of laser heating assembly 24 and the water of mist and vacuum assembly 26. Laser focuser 52 includes a lens mount 52a adjustable along the direction of the path of the laser beam within a base 52b fixedly mounted to head 14. Lens mount 52a supports a lens 52c, which is preferably Toroidal and can be ESI part no. 250746 in an embodiment. As mentioned above, the laser beam is provided by laser source(s) 40. By example, laser focusing scribe lens assembly having part no. 01500-202-000-3 from ESI can also be used as laser reheating assembly 28 to support lens 52c.

Inspection camera 30 is directed to the area of separation and can be used to capture images thereof. No particular mount for inspection camera 30 is required. Further, inspection camera 30 can be any conventional imaging camera as long as it has the ability to provide a desired level of detail.

Figure 2:
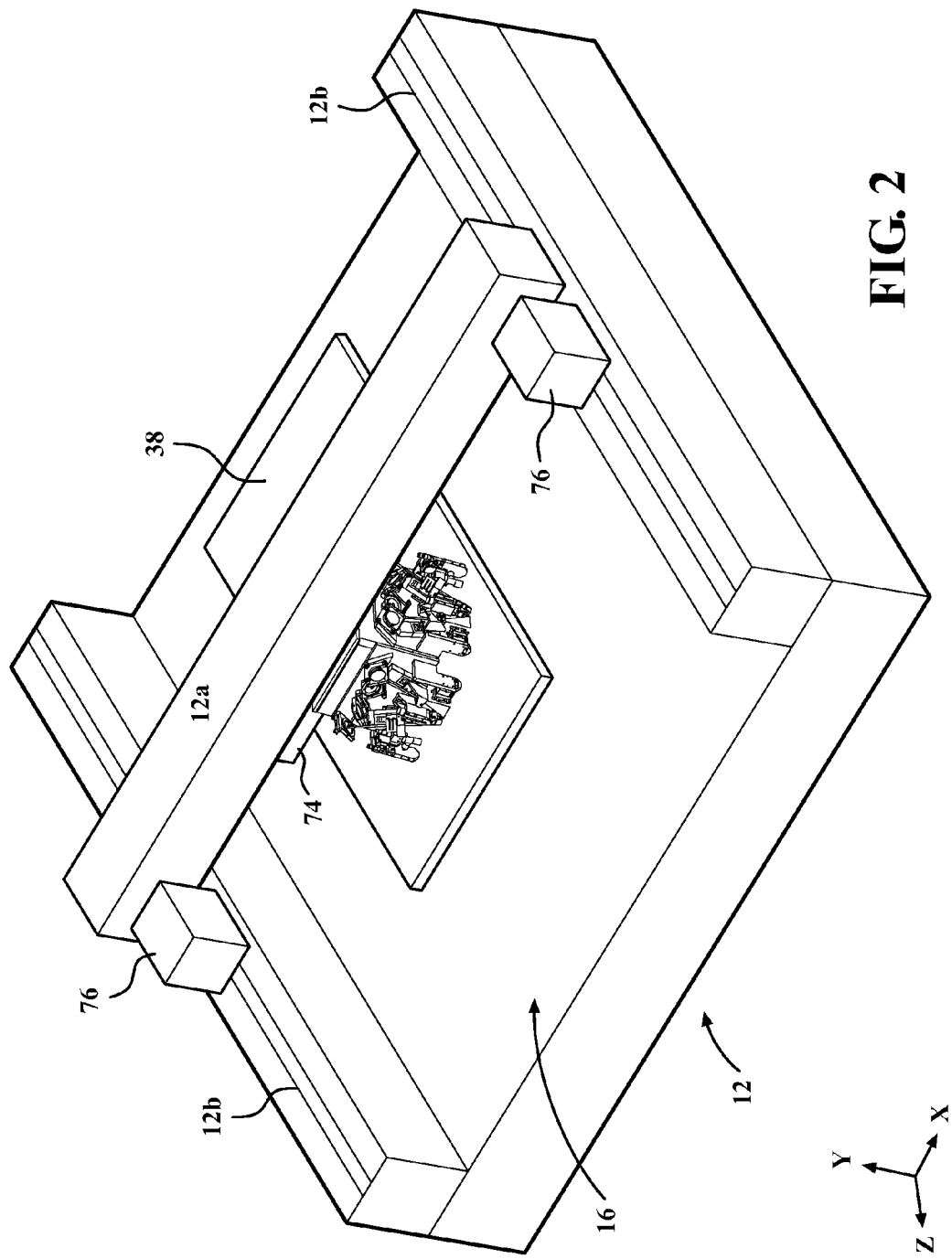
FIG. 2 is a simplified isometric view of the orthogonal integrated cleaving apparatus in accordance with FIG. 1.
Figure 3:
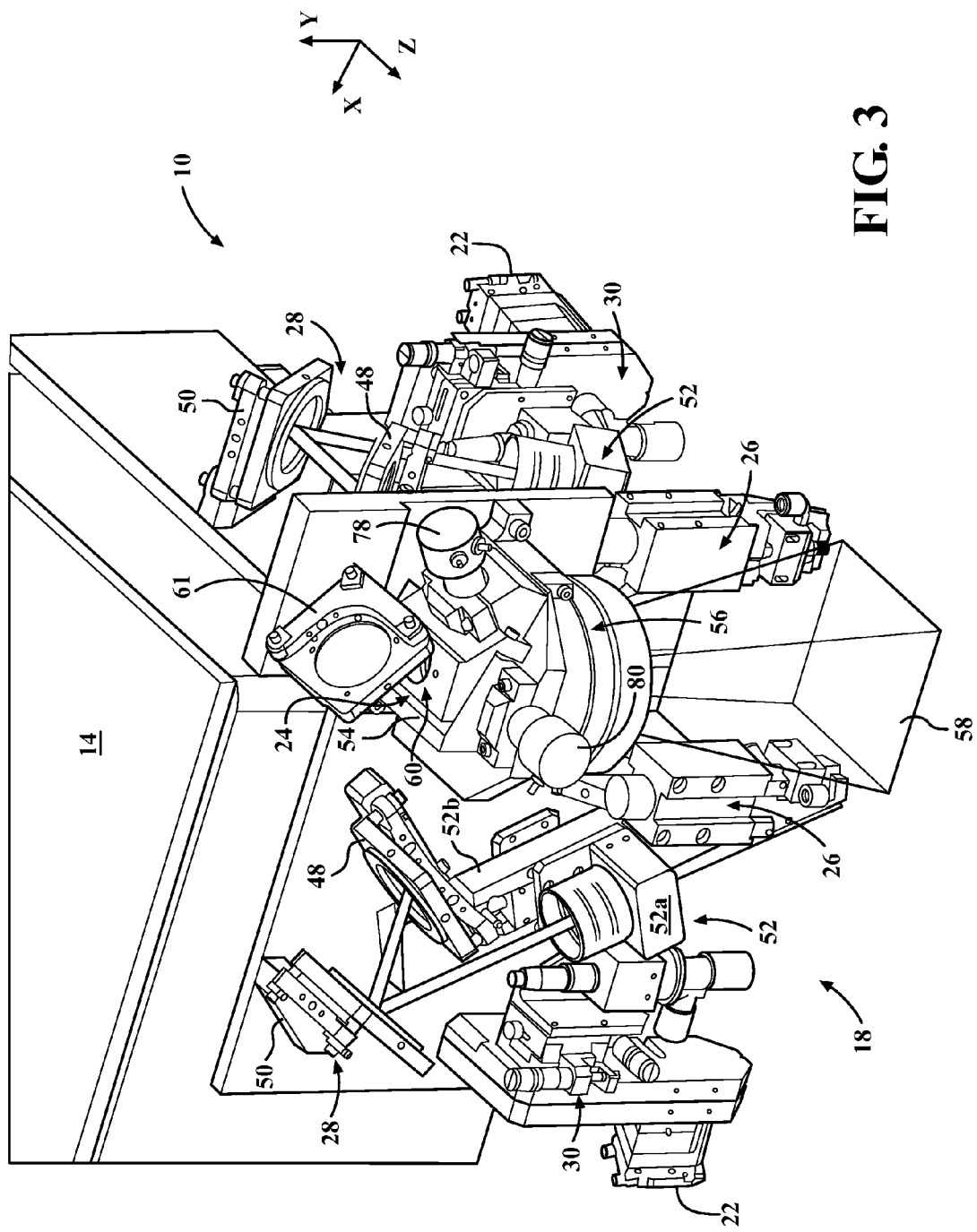
FIG. 3 is a partial perspective view of an orthogonal integrated cleaving device in accordance with another embodiment of the invention.
Figure 4:
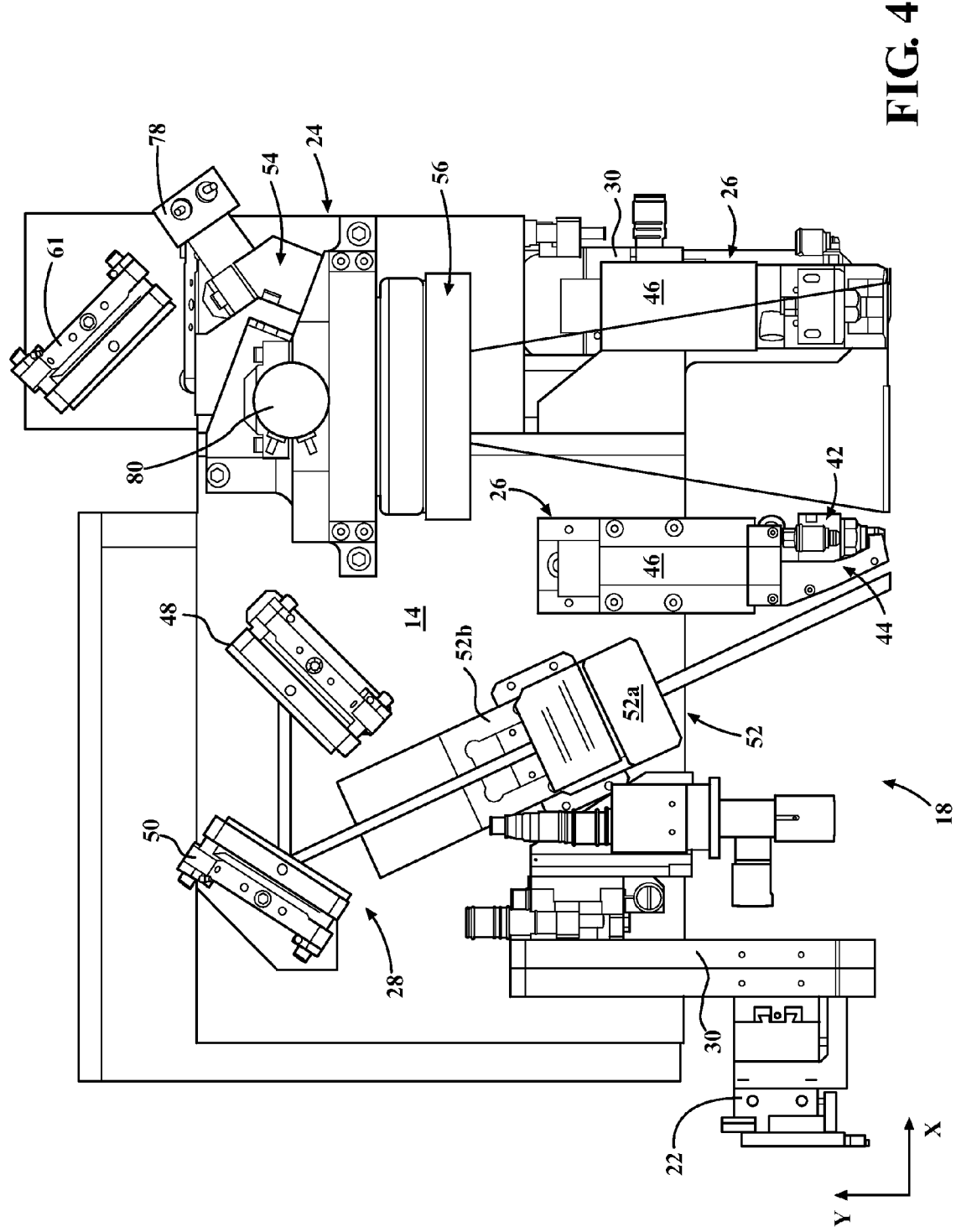
FIG. 4 is a front view of the x-axis cleaving device in accordance with FIG. 3.
Figure 5:
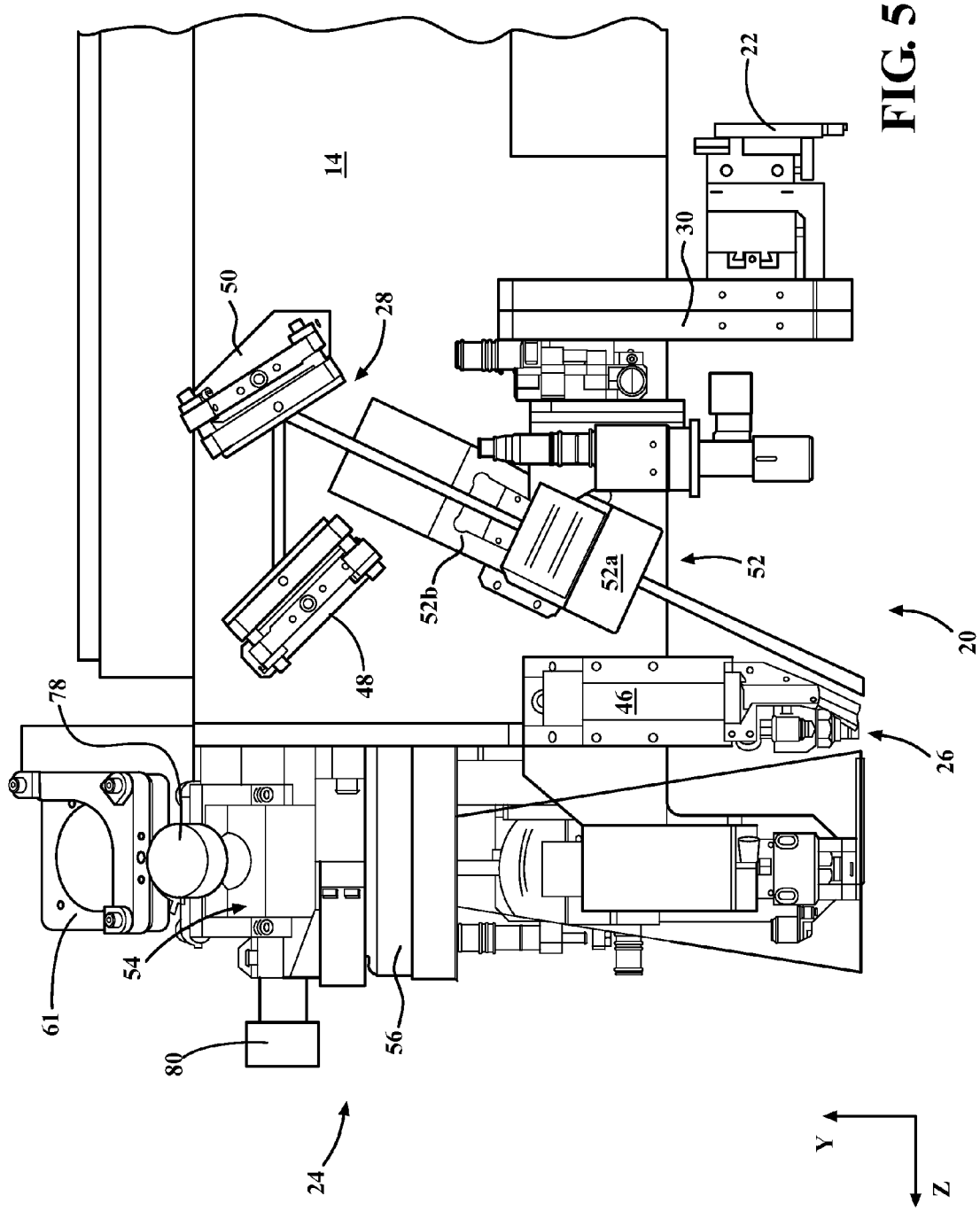
FIG. 5 is a front view of the z-axis cleaving device in accordance with FIG. 3.

FIGS. 3-5 illustrate another embodiment of an orthogonal integrated cleaving apparatus 10 that could be mounted on a gantry 12 as described with respect to FIGS. 1 and 2. The device 18 of FIG. 4 is called the x-axis cleaving device 18 because it operates along the x-axis, while the device 20 of FIG. 5 is called the z-axis cleaving device 20 because it operates along the z-axis. As can be seen, this embodiment is similar to that of FIGS. 1 and 2 except that the initial heating of the glass substrate 38 is performed by a galvo block 54 supporting a relatively large F-theta scan lens 56. The F-theta scan lens 56 is sized so that the scan field 58 it forms (see FIG. 6) encompasses a maximum area between the two mist and vacuum assemblies 26. A telecentric lens can be used in place of the F-theta lens 56, but such a lens would raise the cost of the system. In this embodiment, crack initiator 22 for each axis is mounted with a respective inspection camera 30. To operate the device with glass or another substrate needing such a crack initiator 22, a cleaving device 18, 20 can be positioned to apply its crack initiator 22 to substrate 38 and then be repositioned be use the remaining elements to perform the laser singulation.

Galvo block 54 houses two galvanometer-based scanners 78, 80, commonly called "galvos." Each galvo includes three main components—the galvanometer, a mirror (or mirrors) and a servo driver board that controls the system. Basically, the galvos 78, 80 are arranged along a respective axis and rotate their respective mirror(s) at a high speed from side to side, instead of spinning continuously in one direction. Galvo block 54 includes a laser beam opening 60 into which a laser beam from laser source 40 is directed to the respective galvos by additional mirrors such as mirror 61. Also, more than one laser source 40 can be used as described with respect to FIG. 1.

Figure 6:
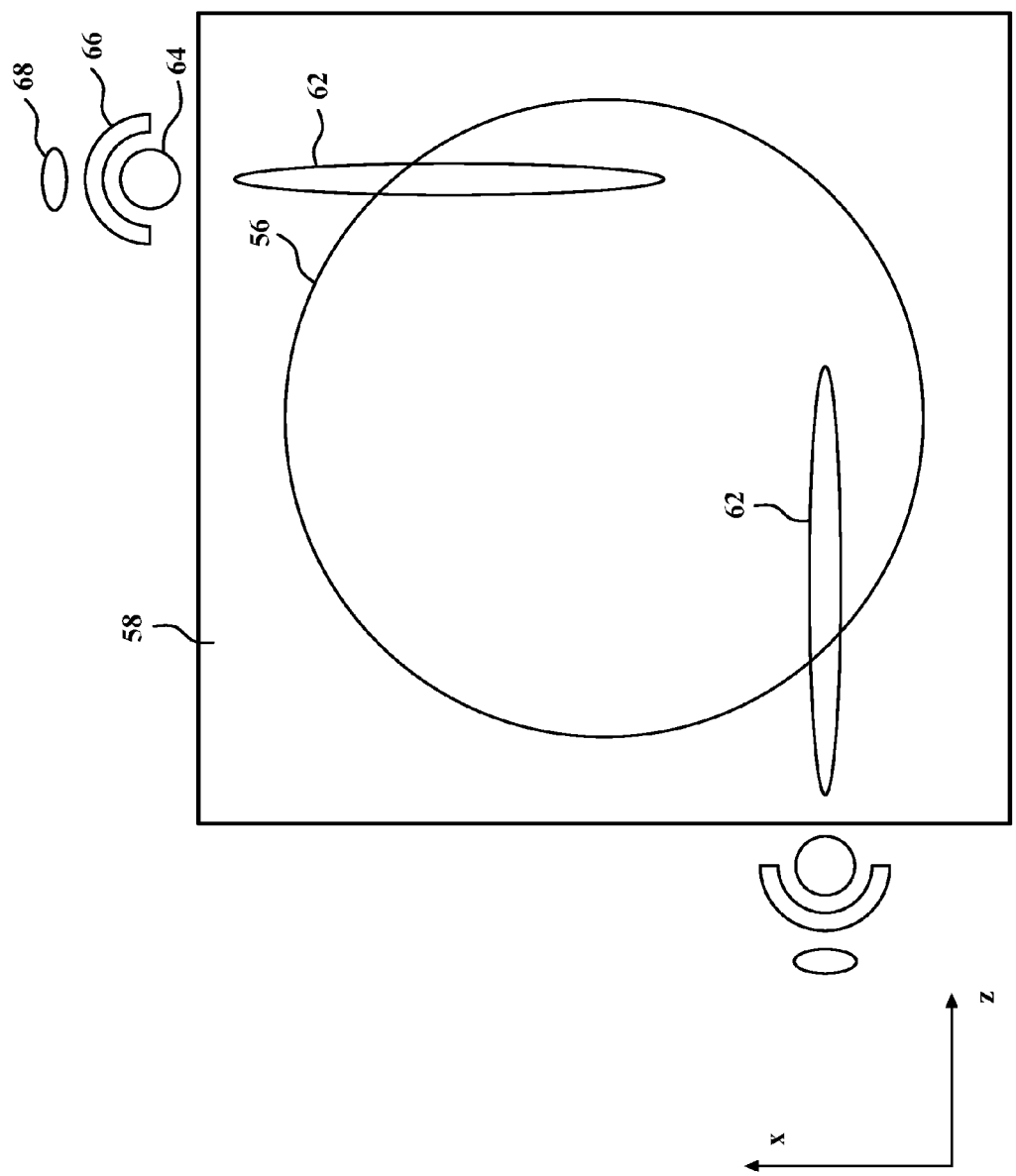
FIG. 6 is a top view schematic illustrating the processing of a work piece using the orthogonal integrated cleaving device in accordance with FIG. 3.

As shown in FIG. 6, F-theta scan lens 56 forms scan field 58 when used with the galvos 78, 80. An outline of F-theta scan lens 56 is included in FIG. 6 for scale. Each galvo 78, 80 deflects the laser beam provided by laser source 40 into laser beam opening 60 to form a first heating beam 62. Heating beam 62 is formed in a tear shape by dithering a galvo 78 and/or 80 at a high frequency that is dependent on the application. The variables considered are traversing speed, glass/substrate composition and thickness and laser power. Mist and vacuum assembly 26 forms a water mist spray 64 in a relatively concentrated area and forms a vacuum pickup area 66 for removing the water mist after cooling. Laser reheating assembly 28 forms an oval-shaped reheating beam 68 as previously described.

In FIG. 6, the processing path defined by heating beam 62, water mist spray 64, vacuum pickup area 66 and reheating beam 68 is shown on both the x- and z-axes. In operation, however, substrate 38 would undergo processing on only one axis at a time. Laser source(s) 40 can be shared between the two devices 18, 20 such that the resulting laser beams are switched from one axis to another with diverting mirrors as described previously. Diverting mirrors could be coupled to motors for automatic control, but it is generally less expensive to merely provide additional mirrors or to re-direct mirrors manually as necessary to re-direct the beams upon a change in cutting direction.

Although this example uses a galvo block 54 incorporating two galvos to form a respective heating beam 62 in a tear drop shape, other embodiments are possible. For example, a single mirror could be tilted about two axes by voice coil actuators or piezoelectric actuators as described in U.S. Patent Publication No. 2008/0093349 A1, published on Apr. 24, 2008 and assigned to the Assignee of the present application and incorporated herein in its entirety by reference. As another possibility instead of using dithering to form heating beams 62 is to form heating beams 62 by incorporating lenses similar to those mounted in laser focuser 36.

Control links between components of orthogonal integrated cleaving apparatus 10 of FIGS. 3-5 are shown in FIG. 7. Controller 70 can be any controller, for example, a microcontroller that includes a central processing unit (CPU), random access memory (RAM), read only memory (ROM) and input/output ports receiving input signals and sending the command signals to components as discussed in more detail below. The command signals are generally output based on programming instructions stored in memory, and the functions of each of the programming instructions are performed by the logic of the CPU. Various components could include their own controllers that transmit data to and from controller 70 as a main controller along a communication path. Moreover, controller 70 could be incorporated into a computer, such as a personal computer. Controller 70 could also be implemented by a one or more microprocessor using external memory.

Controller 70 is in communication with an input device 72. Input device 72 in this example is a touch-screen of a computer, but alternatively input device 72 could be a keyboard, etc., and a separate monitor would be in communication with controller 70. Controller 70 provides instructions as to when to turn on and shut off laser(s) 40 and can also provide instructions as to what control parameters should be used when operation laser(s) 40. As mentioned above, movement of head 14 relative to x- and z-axes is achieved in this embodiment by control of two or more linear motors, here x-axis linear motor 74 and z-axis linear motor 76. Control commands for linear motors 74, 76 are supplied by controller 70. Internal to galvo block 52 are x-axis galvo 78 and z-axis galvo 80, and these galvos also receive commands from controller 70 regarding when to operate.

Mist and vacuum assembly 26 receives water and optionally air through supply line(s) 88 from water supply 82 and air supply 84. Specifically, air and water is provided by supply line(s) 88 to cooling mist nozzle 42. As mentioned above, these supplies 82, 84 are generally mounted in head 14, and they receive on/off commands from controller 70. Vacuum pump 86, also generally housed by head 14, provides a vacuum to vacuum nozzle 44 of mist and air supply 84 through supply line 90. Vacuum pump 86 is controlled by commands from controller 70.

The above-described embodiments have been described in order to allow easy understanding of the present invention, and do not limit the present invention. On the contrary, the invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An orthogonal integrated cleaving apparatus for laser-thermal processing of a substrate, the apparatus comprising:
   a mounting head facing a processing surface supporting the substrate;
   at least one laser source;
   a first cleaving device and a second cleaving device mounted on the mounting head on respective perpendicular planes defined by the mounting head, the perpendicular planes being orthogonal to the processing surface and each cleaving device including:
      assembly means for generating a laser heating beam having a tear-like shape on a surface of the substrate;
      a nozzle that emits a cooling mist on the surface of the substrate, the nozzle located along a cutting axis defined by the laser heating beam, the nozzle located subsequent to the generating means in a cutting direction along the cutting axis;

a vacuum pickup that vacuums up the cooling mist, the vacuum pickup located along the cutting axis and subsequent to the nozzle in the cutting direction; and a reheating assembly that generates a laser heat spot on the surface of the substrate along the cutting axis, the reheating assembly located subsequent to the vacuum pickup in the cutting direction;

a first motor that operates to move one of the mounting head and the processing surface along the cutting axis of the first cleaving device so as to process the substrate using the first cleaving device;

a second motor that operates to move one of the mounting head and the processing surface along the cutting axis of the second cleaving device so as to process the substrate using the second cleaving device; and a controller configured to:
control the first cleaving device while the first motor is operating;
control the second cleaving device while the second motor is operating; and
control the at least one laser source to provide laser energy to the assembly means and the reheating assembly of whichever of the first cleaving device and the second cleaving device is being controlled.

2. The apparatus of claim 1 wherein the mounting head is mounted on a gantry for movement along the cutting axis of the first cleaving device and the cutting axis of the second cleaving device.

3. The apparatus of claim 1 wherein the assembly means for the first cleaving device comprises at least one galvo that generates the laser heating beam along the cutting axis of the first cleaving device and a lens, the lens located between the at least one galvo and the processing surface; wherein the assembly means for the second cleaving device comprises at least one galvo that generates the laser heating beam along the cutting axis of the second cleaving device and the lens, the lens also being located between the at least one galvo and the processing surface, the apparatus further comprising:
a galvo block housing the galvos; and
the lens mounted to a surface of the galvo block facing the processing surface.

4. The apparatus of claim 3 wherein the lens is an F-theta scan lens.

5. The apparatus of claim 3 wherein the at least one galvo of the first cleaving device and the at least one galvo of the second cleaving device comprises a single pair of galvos.

6. The apparatus of claim 1 wherein each assembly means comprises:
a first mirror arranged to direct laser energy from the at least one laser source to a second mirror;
the second mirror arranged to direct the laser energy from the first mirror to a laser focuser; and
the laser focuser directing the laser heating beam to the surface of the substrate using the laser energy from the second mirror.

7. The apparatus of claim 1 wherein the controller is configured to control the first cleaving device while the first motor is operating by:
supplying laser energy to the assembly means of the first cleaving device using the at least one laser source;
controlling a water supply to supply water to the nozzle of the first cleaving device;
controlling a vacuum pump to supply a vacuum to the vacuum pickup of the first cleaving device; and
supplying laser energy to the reheating assembly of the first cleaving device using the at least one laser source.

8. The apparatus of claim 1, further comprising:
a first inspection camera mounted on the mounting head subsequent to the reheating assembly of the first cleaving device in the cutting direction along the cutting axis of the first cleaving device; and
a second inspection camera mounted on the mounting head subsequent to the reheating assembly of the second cleaving device in the cutting direction along the cutting axis of the second cleaving device.

9. The apparatus of claim 1 wherein the reheating assembly comprises:
a first mirror arranged to direct laser energy from the at least one laser source to a second mirror;
the second mirror arranged to direct the laser energy from the first mirror to a laser focuser; and
the laser focuser directing the laser heat spot to the surface of the substrate using the laser energy from the second mirror.

10. An orthogonal integrated cleaving apparatus for laser-thermal processing of a substrate, the apparatus comprising:
a mounting head facing a processing surface supporting the substrate;
at least one laser source;
a first cleaving device mounted on the mounting head on a first plane defined by the mounting head, the first plane being orthogonal to the processing surface, the first cleaving device including:
at least one galvo that generates a laser heating beam having a tear-like shape on a surface of the substrate using the at least one laser source, the laser heating beam defining a cutting axis of the first cleaving device;
an F-theta lens located between the at least one galvo and the processing surface;
a first nozzle that emits a cooling mist on the surface of the substrate along the cutting axis, the first nozzle located subsequent to the at least one galvo in a cutting direction of the first cleaving device;
a first vacuum pickup that vacuums up the cooling mist, the first vacuum pickup located adjacent the first nozzle in the cutting direction of the first cleaving device; and
a first reheating assembly that generates a laser heat spot on the substrate along the cutting axis, the first reheating assembly located subsequent to the first vacuum pickup in the cutting direction of the first cleaving device;
a second cleaving device mounted on the mounting head on a second plane defined by the mounting head, the second plane being orthogonal to the first plane and to the processing surface, the second cleaving device including:
at least one galvo that generates a laser heating beam having a tear-like shape on a surface of the substrate using the at least one laser source, the laser heating beam defining a cutting axis of the second cleaving device, the F-theta lens located between the at least one galvo and the processing surface;
a second nozzle that emits a cooling mist on the surface of the substrate along the cutting axis, the second nozzle located subsequent to the at least one galvo in a cutting direction of the second cleaving device;
a second vacuum pickup that vacuums up the cooling mist, the second vacuum pickup located adjacent the second nozzle in the cutting direction of the second cleaving device; and a second reheating assembly that generates a laser heat spot on the substrate along the cutting axis, the second reheating assembly located subsequent to the second vacuum pickup in the cutting direction of the second cleaving device;

a first motor that operates to move one of the mounting head and the processing surface along the cutting axis of the first cleaving device so as to process the substrate in the cutting direction of the first cleaving device using the first cleaving device;

a second motor that operates to move one of the mounting head and the processing surface along the cutting axis of the second cleaving device so as to process the substrate in the cutting direction of the second cleaving device using the second cleaving device; and a controller configured to:

control the first cleaving device while the first motor is operating;

control the second cleaving device while the second motor is operating;

control the at least one laser source to provide laser energy to the at least one galvo of the first cleaving device and the first reheating assembly while the controller is controlling the first cleaving device; and control the at least one laser source to provide laser energy to the at least one galvo of the second cleaving device and the second reheating assembly while the controller is controlling the second cleaving device.

11. The apparatus of claim 10 wherein the at least one laser source comprises at least a first laser source and a second laser source; wherein the controller is configured to control the at least one laser source to provide laser energy to the at least one galvo of the first cleaving device and the first reheating assembly while the controller is controlling the first cleaving device by controlling the first laser source to provide the laser energy to the at least one galvo of the first cleaving device and the first reheating assembly; and wherein the controller is configured to control the at least one laser source to provide laser energy to the at least one galvo of the second cleaving device and the second reheating assembly while the controller is controlling the second cleaving device by controlling the second laser source to provide the laser energy to the at least one galvo of the second cleaving device and the second reheating assembly.

12. The apparatus of claim 10 wherein the at least one laser source comprises at least a first laser source and a second laser source; wherein the controller is configured to control the at least one laser source to provide laser energy to the at least one galvo of the first cleaving device and the first reheating assembly while the controller is controlling the first cleaving device by controlling the first laser source to provide the laser energy to the at least one galvo of the first cleaving device and by controlling the second laser source to provide the laser energy to the first reheating assembly; and wherein the controller is configured to control the at least one laser source to provide laser energy to the at least one galvo of the second cleaving device and the second reheating assembly while the controller is controlling the second cleaving device by controlling the first laser source to provide the laser energy to the at least one galvo of the second cleaving device and by controlling the second laser source to provide the laser energy to the second reheating assembly.

13. The apparatus of claim 10 wherein the at least one galvo of the first cleaving device and the at least one galvo of the second cleaving device comprises a single pair of galvos.

* * * * *